United States Patent
St. Hilaire

(10) Patent No.: US 8,040,601 B1
(45) Date of Patent: Oct. 18, 2011

(54) PROJECTION SCREEN USING A BRAGG SELECTIVE HOLOGRAPHIC ELEMENT

(75) Inventor: Pierre St. Hilaire, Belmont, CA (US)

(73) Assignee: AllView Research LLC, Belmont, CA (US)

( * ) Notice: Subject to any disclaimer, the term of this patent is extended or adjusted under 35 U.S.C. 154(b) by 451 days.

(21) Appl. No.: 12/214,795

(22) Filed: Jun. 20, 2008

Related U.S. Application Data

(60) Provisional application No. 60/936,863, filed on Jun. 22, 2007.

(51) Int. Cl.
    *G03B 21/56* (2006.01)
(52) U.S. Cl. .................... 359/443; 359/449
(58) Field of Classification Search .......... 359/443, 359/460, 449, 459
    See application file for complete search history.

(56) References Cited

U.S. PATENT DOCUMENTS

| | | | |
|---|---|---|---|
| 6,005,714 A | 12/1999 | Welch | |
| 6,167,112 A * | 12/2000 | Schneider | 378/43 |
| 6,236,511 B1 | 5/2001 | Brown | |
| 6,934,080 B2 * | 8/2005 | Saccomanno et al. | 359/460 |
| 7,094,709 B2 * | 8/2006 | Karkkainen | 438/780 |
| 7,236,277 B2 * | 6/2007 | Kawano et al. | 359/3 |
| 7,457,017 B2 * | 11/2008 | Kremen | 359/20 |
| 7,719,762 B2 * | 5/2010 | Kumasawa et al. | 359/449 |
| 2004/0066547 A1 | 4/2004 | Parker et al. | |

OTHER PUBLICATIONS

Zhu et al., Polymeric multi-channel bandpass filters in phase-shifted Bragg waveguide gratings by direct electron beam writing, Dec. 2004, Optics Express vol. 12, No. 25, pp. 6372-6376.*

* cited by examiner

*Primary Examiner* — Christopher Mahoney
(74) *Attorney, Agent, or Firm* — Van Pelt, Yi & James LLP

(57) ABSTRACT

A front projection system comprises a display source and a front projection screen. A rear projection system comprises a display source and a rear projection screen. The display source generates illumination. The front or rear projection screen comprises a plurality of high aspect ratio structures are configured to act as a Bragg selective holographic element. The plurality of high aspect ratio structures are configured to diffract the illumination toward a viewer.

37 Claims, 7 Drawing Sheets

PROJECTION SCREEN USING A BRAGG SELECTIVE HOLOGRAPHIC ELEMENT

CROSS REFERENCE TO OTHER APPLICATIONS

This application claims priority to U.S. Provisional Patent Application No. 60/936,863 entitled PROJECTION SCREEN USING A BRAGG SELECTIVE HOLOGRAPHIC ELEMENT filed Jun. 22, 2007 which is incorporated herein by reference for all purposes.

BACKGROUND OF THE INVENTION

Some projection screen configurations use a volume holographic element (VHE) as a display screen. A volume holographic element exhibits a property known as Bragg selectivity. Bragg selectivity results in the light coming from only a narrow range of angles and having a narrow spectral extent to be efficiently diffracted, while having little effect on other rays. Typical volume holograms are interferometrically written. These volume holograms offer considerable performance advantages for applications that require high efficiency, low noise, and Bragg selectivity. However, these structures require the use of expensive materials—for example silver halide, dichromated gelatin, or photopolymers. Moreover, they cannot be replicated by embossing, imprinting, or injection molding. Each element has to be individually manufactured using interferometric techniques, which can be difficult and expensive. The high cost of volume holograms hinders their use in low cost applications such as display screens.

BRIEF DESCRIPTION OF THE DRAWINGS

Various embodiments of the invention are disclosed in the following detailed description and the accompanying drawings.

DETAILED DESCRIPTION

Figure 1:
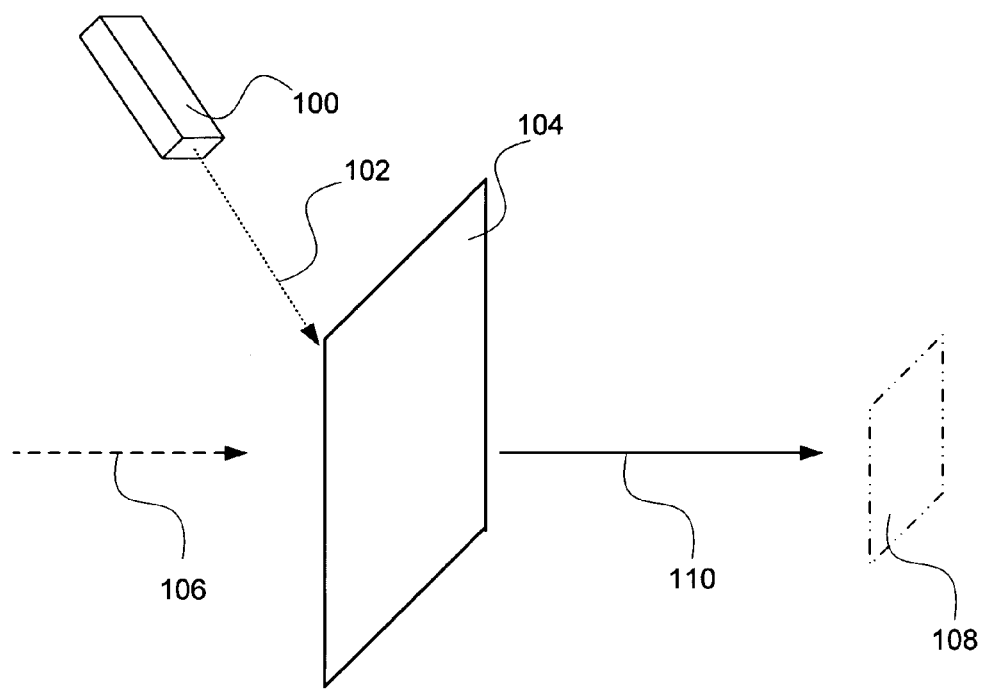
FIG. 1 is a block diagram illustrating an embodiment of a rear projection system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A projection system is disclosed. The projection system comprises a display source. The display source generates illumination. The projection system further comprises a projection screen. The projection screen includes high aspect ratio structures that are configured to act as a Bragg selective holographic element. The high aspect ratio structures are configured to diffract the illumination toward a viewer. In various embodiments, the projection screen comprises a front or a back projection screen.

In some embodiments, a projection screen includes Bragg selective high aspect ratio, slanted diffractive structures to efficiently diffuse light coming from a selected source onto a preset range of angles. The slanted diffractive structures are achieved by calculating and writing very high aspect ratio, slanted structures within a photosensitive material. These structures can then be economically mass replicated by either injection molding, or by a number of techniques that are similar to conventional embossing, albeit over a much finer scale. In some embodiments, the replication is achieved using "nano-imprinting." High aspect ratio refers to structures for which a feature in one dimension (e.g., depth) is significantly larger than a feature in one other dimension (e.g., a lateral size).

Injection molding is a well-established technique in which a plastic is injected into a mold as a liquid, and then solidifies. The surface pattern of the mold is left imprinted onto the part after the mold is removed. Most plastic parts are manufactured by a variant of the technique. Nano-imprinting refers to a class of technologies in which the desired pattern is stamped onto the surface, in a manner akin to traditional rubber stamping. Both techniques can resolve surface features down to tens of nanometers if used properly.

In some embodiments, a high aspect ratio slanted structure comprises slanted ridges exhibiting a very high aspect ratio. High-aspect ratio refers to structures which have far more elongation in a specific dimension than in the others. As an example, a lateral feature size of 200 nm is typical, while the height for the structures will typically range between 3 and 12 micrometers. This consequence of the high aspect ratio is that the structures operate in the Bragg diffraction regime, and can thus be designed as highly spectrally and angularly selective optical elements.

FIG. 1 is a block diagram illustrating an embodiment of a rear projection system. In the example shown, display projector 100 projects its illumination along arrow 102 toward projection screen 104. Projection screen 104 diffracts the illumination from display projector 100 toward viewing window 108 (e.g., along arrow 110). Projection screen 104 allows light to pass through similar to a transparent window. Visible light passes through the window along arrow 110 and arrow 106 to arrive at viewing window 108.

In various embodiments, display projector 100 comprises a video projector—for example, a scanning projector, a liquid crystal display (LCD) array with an illumination source, a digital light processing (DLP) unit with an illumination source, or any other appropriate projector system.

In some embodiments, the rear projection system is used to display information to a viewer in the same visual space as what is visible through the projection screen.

Figure 2:
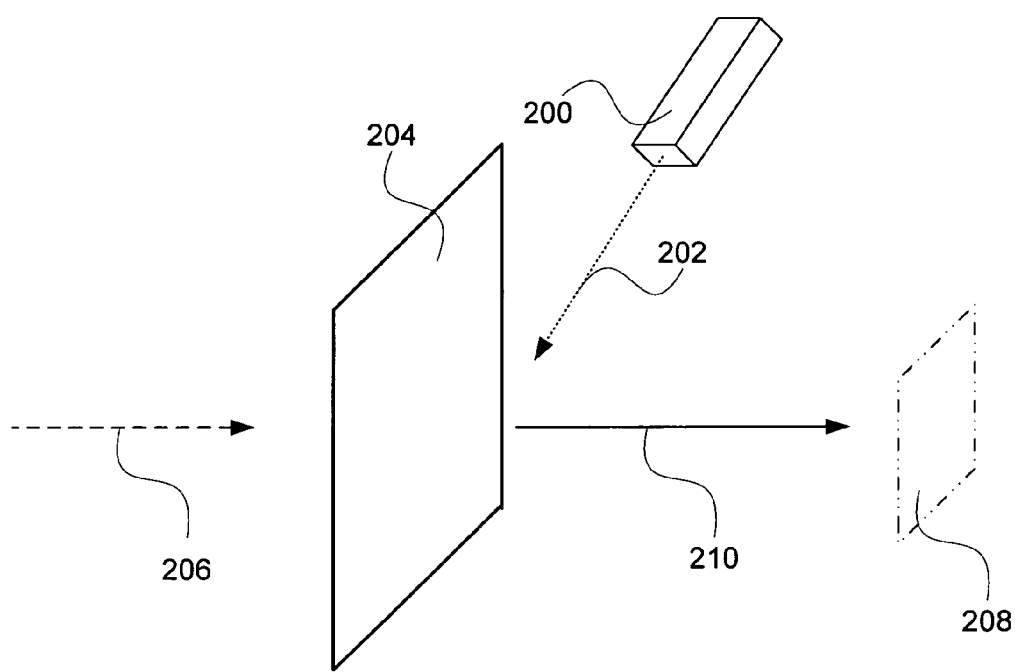
FIG. 2 is a block diagram illustrating an embodiment of a front projection system.

FIG. 2 is a block diagram illustrating an embodiment of a front projection system. In the example shown, display projector 200 projects its illumination along arrow 202 toward projection screen 204. Projection screen 204 diffracts the illumination from display projector 200 toward viewing window 208 (e.g., along arrow 210). Projection screen 204 allows light to pass through similar to a transparent window. Visible light passes through the window along arrow 210 and arrow 206 to arrive at viewing window 208.

In various embodiments, display projector 200 comprises a video projector—for example, a scanning projector, a liquid crystal display (LCD) array with an illumination source, a digital light processing (DLP) unit with an illumination source, or any other appropriate projector system.

In some embodiments, the front projection system is used to display information to a viewer in the same visual space as what is visible through the projection screen. In various embodiments, the projection screen is transparent, is reflective, is opaque, is translucent, or has any other appropriate optical properties.

Figure 3:
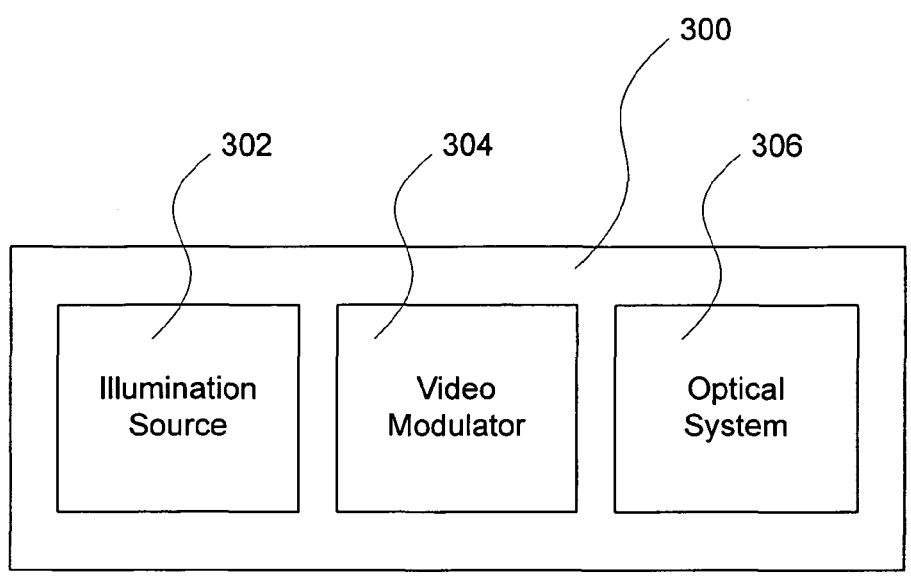
FIG. 3 is a diagram illustrating an embodiment of a display projector.

FIG. 3 is a diagram illustrating an embodiment of a display projector. In some embodiments, display projector 300 of FIG. 3 is used to implement display projector 100 of FIG. 1 or display projector 200 of FIG. 2. In the example shown, display projector 300 includes illumination source 302, video modulator 304, and optical system 306. Illumination source 302 comprises a bright source able to project light that is modulated using video modulator 304 via optical system 306 to a projection screen. In various embodiments, illumination source 302 comprises one or more of the following: a coherent source, a non-coherent source, a monochromatic source, a polychromatic source, or any other appropriate illumination source. Video modulator 304 includes static or dynamic elements that modulate an illumination source to achieve a desired display of information for a viewer. For example, overlay information to enhance the field of view (e.g., infrared information translated to a visible display to show heat signatures in the field of view) or supplemental information for an art exhibit or other display. In various embodiments, video modulator 304 comprises an LCD array, a DLP array, or any other appropriate modulation unit. Optical system 306 projects the illumination from illumination source 302 that is modulated using modulator 304 to be incident on a display screen (e.g., a lens system or a mirror system). The projection screen diffracts the incident illumination toward a viewer within a viewing window. In some embodiments, the projection screen also allows light to pass through as a transparent window would; the viewer is able to view what is visible on the other side of the projection screen as well as the information projected by the display projector 300. In various embodiments, the projection screen does not allow light to pass through and is translucent, reflective, opaque, or has any other appropriate optical property.

Figure 4:
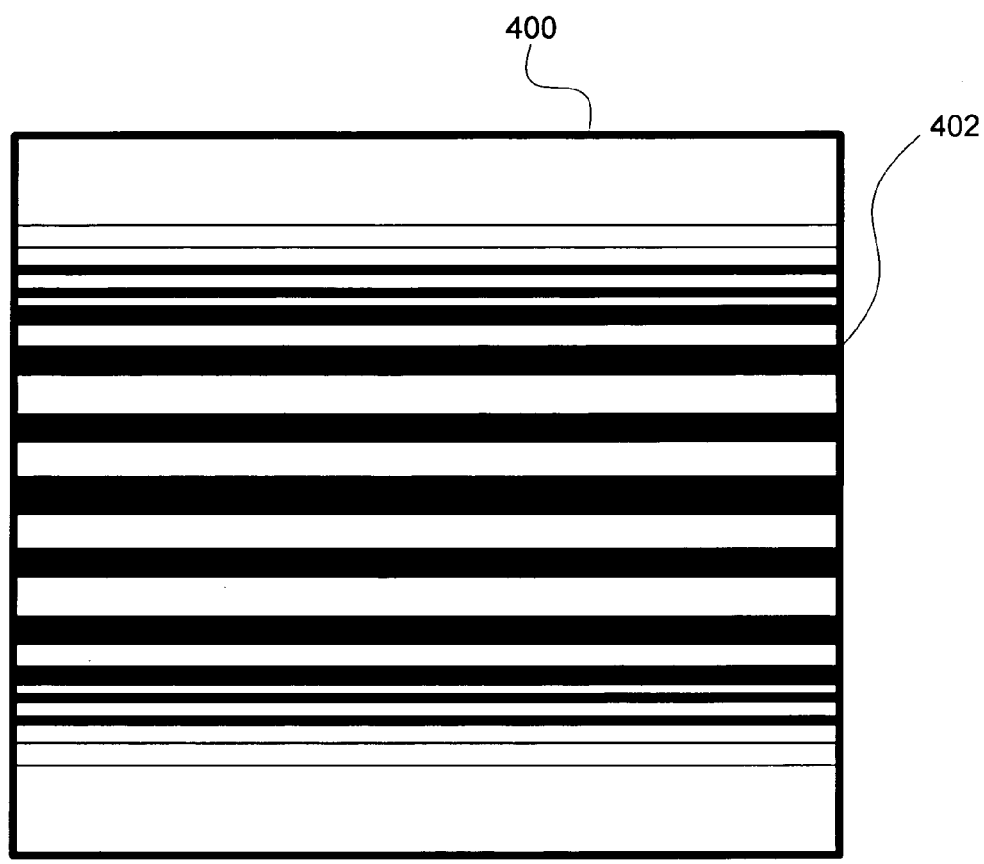
FIG. 4 is a diagram illustrating an embodiment of a projection screen.

FIG. 4 is a diagram illustrating an embodiment of a projection screen. In some embodiments, projection screen 400 of FIG. 4 is used to implement projection screen 104 of FIG. 1 or projection screen 204 of FIG. 2. In the example shown, combiner 400 includes a plurality of structures (e.g., line 402) able to diffract a modulated illumination source into a viewing window. Each of the plurality of structures is comprised of one or more high aspect ratio structures configured to form a Bragg selective holographic element. In some embodiments, the plurality of structures of projection screen 400 diffract a display projector's illumination toward a viewing window. In some embodiments, the plurality of structures of projection screen 400 comprise a series of line structures with different line densities at different heights within the projection screen. In some embodiments, for a viewer, projection screen 400 enables viewing of the modulated illumination source as well as what is visible through projection screen 400; projection screen 400 acts similar to a transparent window for viewing what is visible beyond projection screen 400. In some embodiments, for a viewer, projection screen 400 only enables the viewing of the modulated illumination source.

Figure 5:
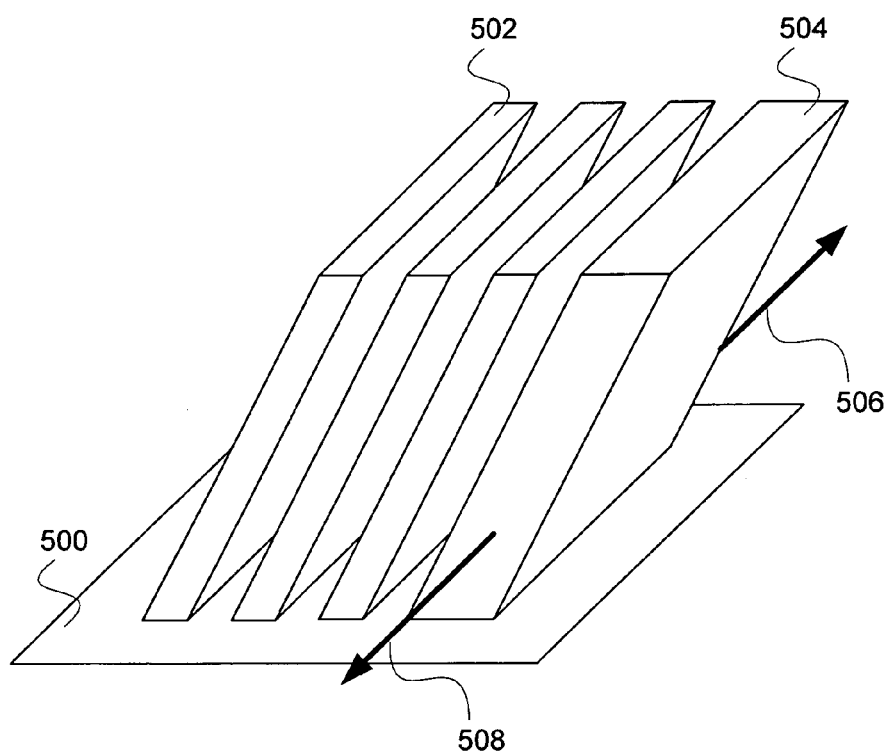
FIG. 5 is a diagram illustrating an embodiment of a high aspect ratio structure.

FIG. 5 is a diagram illustrating an embodiment of a high aspect ratio structure. In the example shown, substrate 500 is coupled to a plurality of high aspect ratio structures—for example, structure 502 and structure 504. High-aspect ratio structures refer to structures which have far more elongation in a specific dimension than in one of the other dimensions. The plurality of high aspect ratio structures form a diffractive optic element able to diffract a display projector illumination. The diffractive optic element includes high aspect ratio structures with an optical property (e.g., index of refraction) that is different from the optical property of the spaces in between the high aspect ratio structures. The diagram of FIG. 5 representing structures (e.g., structures 502 and structures 504) is not necessarily to scale. Structure 504 are a part of a larger structure (e.g., a line such as line 402 of FIG. 4). The larger structure extends beyond the structures shown in FIG. 5; for example, the structure extends along arrow 506 and/or along arrow 508. In various embodiments, a line is comprised of a single structure or a plurality of structures. In various embodiments, structure 502 and/or structure 504 is/are comprised of plastic or polymer that has been molded or embossed or polymerized or any other appropriate manner of making a structure. In some embodiments, structure 502 and/or structure 504 is/are mass produced. In some embodiments, substrate 500 comprises plastic, glass, quartz, metal, or any other appropriate support structure for a high aspect ratio structure. In various embodiments, substrate 500 and/or structure 502 and/or structure 504 are contiguous, are comprised of the same material, are comprised of different materials, is/are one or more of the following: plastic, a polymer, a glass, quartz, or any other appropriate material.

Figure 6:
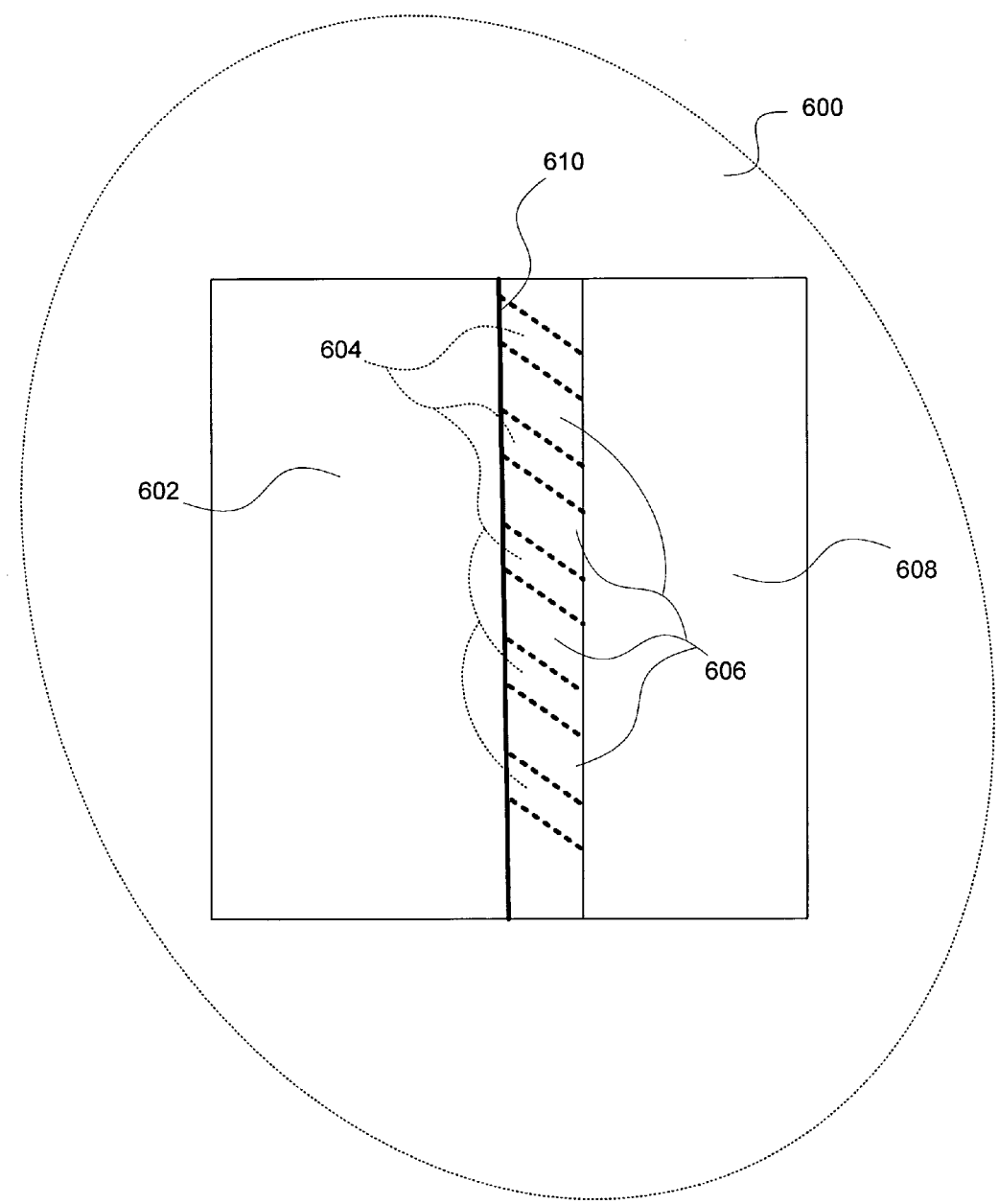
FIG. 6 is a diagram illustrating an embodiment of a projection screen cross section.

FIG. 6 is a diagram illustrating an embodiment of a projection screen cross section. In the example shown, projection screen 600 includes window 602 and window 608. High aspect ratio structures 604 are placed between window 602 and window 608. Between high aspect ratio structures 604 in spaces 606, a material is placed with optical properties (e.g., index of refraction) different from high aspect ratio structures 604. High aspect ratio structures 604 comprise a structure able to diffract incident illumination toward a viewer. In some embodiments, high aspect ratio structures 604 are coupled to a substrate (e.g., plastic sheet)—for example, a substrate along surface of window 602 located along line 610. In various embodiments, window 602 and/or window 608 are not included in the projection screen. In various embodiments, window 602 and/or window 608 comprise a glass, a plastic, a polymer, a laminate, or any other material that is appropriate for a combiner.

Figure 7:
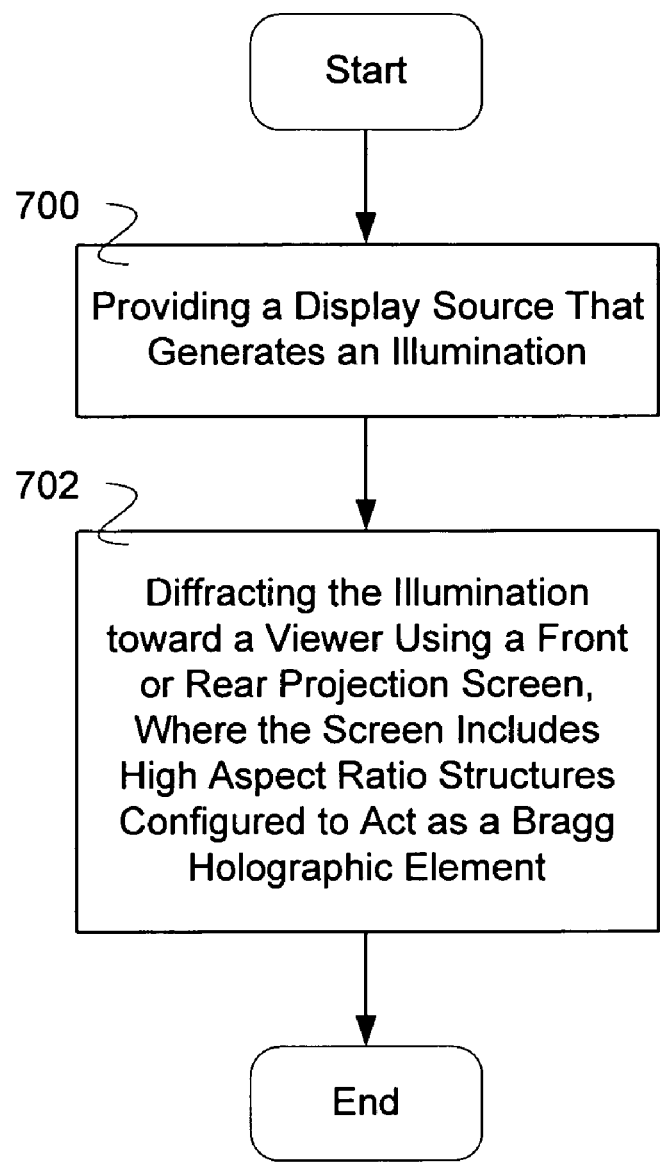
FIG. 7 is a flow diagram illustrating an embodiment of a process for a combiner.

FIG. 7 is a flow diagram illustrating an embodiment of a process for a combiner. In the example shown, in 700 a display source is provided to generate an illumination. In 702, the illumination is diffracted toward a viewer using a front or rear projection screen. The projection screen includes high aspect ratio structures configured to act as a Bragg holographic element.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A front projection system, comprising:
   a display source, wherein the display source generates an illumination;
   a front projection screen,
      wherein the front projection screen comprises a plurality of high aspect ratio structures are configured to act as a Bragg selective holographic element, wherein the plurality of high aspect ratio structures include a feature in a depth dimension that is significantly larger than a feature in a lateral dimension; and
      wherein the plurality of high aspect ratio structures are configured to diffract the illumination toward a viewer, wherein the plurality of high aspect ratio structures vary across the front projection screen.

2. A system as in claim 1, wherein the display source includes an illumination source.

3. A system as in claim 1, wherein the display source includes a modulator.

4. A system as in claim 3, wherein the modulator includes an LCD array.

5. A system as in claim 3, wherein the modulator includes a DLP array.

6. A system as in claim 3, wherein the modulator comprises a video modulator.

7. A system as in claim 1, wherein the display source includes an optical system.

8. A system as in claim 1, wherein the plurality of high aspect ratio structures are mass replicated.

9. A system as in claim 8, wherein the mass replication is by injection molding.

10. A system as in claim 8, wherein the mass replication is by nano-imprinting.

11. A system as in claim 1, further comprising a first window.

12. A system as in claim 1, further comprising a first window and a second window, wherein the plurality of high aspect ratio structures are between the first window and the second window.

13. A system as in claim 1, wherein the front projection screen has one of the following optical properties: transparency, translucency, opacity, or reflectivity.

14. A rear projection system, comprising:
   a display source, wherein the display source generates an illumination;
   a rear projection screen,
      wherein the rear projection screen comprises a plurality of high aspect ratio structures are configured to act as a Bragg selective holographic element, wherein the plurality of high aspect ratio structures include a feature in a depth dimension that is significantly larger than a feature in a lateral dimension; and
      wherein the plurality of high aspect ratio structures are configured to diffract the illumination toward a viewer, wherein the plurality of high aspect ratio structures vary across the rear projection screen.

15. A system as in claim 14, wherein the display source includes an illumination source.

16. A system as in claim 14, wherein the display source includes a modulator.

17. A system as in claim 16, wherein the modulator includes an LCD array.

18. A system as in claim 16, wherein the modulator includes a DLP array.

19. A system as in claim 16, wherein the modulator comprises a video modulator.

20. A system as in claim 14, wherein the display source includes an optical system.

21. A system as in claim 14, wherein the plurality of high aspect ratio structures are mass replicated.

22. A system as in claim 21, wherein the mass replication is by injection molding.

23. A system as in claim 21, wherein the mass replication is by nano-imprinting.

24. A system as in claim 14, further comprising a first window.

25. A system as in claim 14, further comprising a first window and a second window, wherein the plurality of high aspect ratio structures are between the first window and the second window.

26. A method for a projection screen system, comprising:
   providing a display source, wherein the display source generates an illumination;
   diffracting the illumination toward a viewer using a projection screen, wherein the projection screen includes a plurality of high aspect ratio structures configured to act as a Bragg holographic element, wherein the plurality of high aspect ratio structures include a feature in a depth dimension that is significantly larger than a feature in a lateral dimension, and wherein the plurality of high aspect ratio structures vary across the projection screen.

27. A method as in claim 26, wherein the display source includes an illumination source.

28. A method as in claim 26, wherein the display source includes a modulator.

29. A method as in claim 28, wherein the modulator includes an LCD array.

30. A method as in claim 28, wherein the modulator includes a DLP array.

31. A method as in claim 28, wherein the modulator comprises a video modulator.

32. A method as in claim 26, wherein the display source includes an optical system.

33. A method as in claim 26, wherein the plurality of high aspect ratio structures are mass replicated.

34. A method as in claim 33, wherein the mass replication is by injection molding.

35. A method as in claim 33, wherein the mass replication is by nano-imprinting.

36. A method as in claim 26, further comprising a first window.

37. A method as in claim 26, further comprising a first window and a second window, wherein the plurality of high aspect ratio structures are between the first window and the second window.

* * * * *